(12) United States Patent
Zhang

(10) Patent No.: US 11,192,352 B2
(45) Date of Patent: Dec. 7, 2021

(54) DISPLAY PANEL MANUFACTURING METHOD

(71) Applicant: WUHAN CHINA STAR OPTOELECTRONICS TECHNOLOGY CO., LTD., Wuhan (CN)

(72) Inventor: Wei Zhang, Wuhan (CN)

( * ) Notice: Subject to any disclaimer, the term of this patent is extended or adjusted under 35 U.S.C. 154(b) by 301 days.

(21) Appl. No.: 16/466,302

(22) PCT Filed: Mar. 4, 2019

(86) PCT No.: PCT/CN2019/076807
§ 371 (c)(1),
(2) Date: Jun. 4, 2019

(87) PCT Pub. No.: WO2020/107733
PCT Pub. Date: Jun. 4, 2020

(65) Prior Publication Data
US 2021/0178741 A1  Jun. 17, 2021

(30) Foreign Application Priority Data
Nov. 30, 2018  (CN) .......................... 201811458558.9

(51) Int. Cl.
*B32B 38/00* (2006.01)
*B32B 37/12* (2006.01)
(Continued)

(52) U.S. Cl.
CPC .......... *B32B 38/0008* (2013.01); *B32B 37/12* (2013.01); *G02F 1/1336* (2013.01);
(Continued)

(58) Field of Classification Search
CPC ............ G02F 1/1333; G02F 1/133308; G02F 1/133314; G02F 1/133325;
(Continued)

(56) References Cited

FOREIGN PATENT DOCUMENTS

CN    201097050 Y  *  8/2008
CN    201097050 Y     8/2008
(Continued)

OTHER PUBLICATIONS

Machine translation of ISR of CN 19076807.*
(Continued)

*Primary Examiner* — Sonya M Sengupta

(57) ABSTRACT

A display panel manufacturing method for solving the phenomenon of Newton's rings on a display screen is provided, including: conducting a roughening treatment to a bonding surface of a frame of a backlight module in order to improve a securing force of the frame to an adhesive layer and a film thereon; reducing a release force of a protective film from the film above the backlight module in order to reduce a pulling force to the film below the protective film and the adhesive layer below the film when peeling off the protective film from the film; and bonding the film to the frame of the backlight module with an extended bonding time in a bonding process in order to increase adhering strength between the film and the bonding surface of the frame of the backlight module.

20 Claims, 2 Drawing Sheets

(51) Int. Cl.
*G02F 1/1335* (2006.01)
*G02F 1/13357* (2006.01)
*B32B 37/26* (2006.01)

(52) U.S. Cl.
CPC .. *G02F 1/133528* (2013.01); *B32B 2037/268* (2013.01); *B32B 2457/202* (2013.01); *C09J 2203/318* (2013.01)

(58) Field of Classification Search
CPC ............ G02F 1/133528; G02F 1/1336; G02F 2202/28; C09J 2203/318; B32B 2457/202; B32B 37/12; B32B 38/0008
USPC .................... 428/1.1, 1.5; 156/289, 290, 291
See application file for complete search history.

(56) References Cited

FOREIGN PATENT DOCUMENTS

| CN | 104375306 A | * | 2/2015 |
|----|-------------|---|--------|
| CN | 104375306 A |   | 2/2015 |
| CN | 107908039 A | * | 4/2018 |
| CN | 107908039 A |   | 4/2018 |
| CN | 207937989 U |   | 10/2018 |

OTHER PUBLICATIONS

Written Opinion of CN201811458558.*
English translation of CN 104375306.*
English translation of CN 107908039.*
English translation of CN201097050.*

* cited by examiner

DISPLAY PANEL MANUFACTURING METHOD

FIELD OF INVENTION

The present invention relates to the field of display technology, and in particular, to a display panel manufacturing method for solving the phenomenon of Newton's rings in display screens.

BACKGROUND OF INVENTION

In a manufacturing process of displays, because films, glass substrates, and the like in the displays closely contact each other, this results in structural bending or unevenness, and leads to abnormal adsorption of the films in components, which is a main cause for the phenomenon of Newton's rings on screens of the displays.

Before a backlight module bonds to a liquid crystal unit, a pulling force (release force) due to peeling off a protective layer above the backlight module will pull the film below the protective layer and an adhesive layer below the film layer, resulting in the film and the adhesive layer which is contacting a bonding surface of a frame to be slightly detached and arched.

After the backlight module and the liquid crystal unit are bonding, a part of the film above the backlight module is adhered to a lower polarizer of a liquid crystal cell, causing the phenomenon of Newton's rings to appear on the display screen, which seriously affects the optical quality and display.

A conventional method for preventing the phenomenon of Newton's rings from appearing on the display screen, including maintaining a certain gap between the films to avoid that they are closely contacting each other to prevent the phenomenon of Newton's rings from occurring.

Conventional proposals, for example, conducting sandblasting treatment on a surface of a film or using a film which is subjected to unevenness treatment on one or both sides of the film. However, the above methods require additional processes or additional components so that increasing production costs.

Therefore, the present invention provides a method of preventing the phenomenon of Newton's rings from appearing on display screens.

Technical Problem

Please refer to FIG. 1. A display panel 10 has Newton's rings 90 in the middle position thereof.

Please refer to FIG. 2. After a technician disassembles a backlight module and a display panel, it is found that a film 102 above the backlight module and a lower polarizer 101 of a liquid crystal cell are adhered by an adhesive layer 100 around the four sides thereof. The middle portion of the film 102 is upwardly arched and is partially absorbed by the lower polarizer 101 of the liquid crystal cell. A position where the adsorption occurs corresponds to the position of Newton's rings 90 of the display panel 10 in FIG. 1. Based on this finding, it has been experimentally verified that the above adsorption phenomenon causes the occurrence of Newton's rings 90.

Technical Solution

The invention provides a display panel manufacturing method for solving the phenomenon of Newton's rings on a display screen, comprising: conducting a roughening treatment to the bonding surface of a frame of a backlight module in order to improve a securing force of the frame to an adhesive layer and a film thereon; reducing a release force of a protective film from the film above the backlight module in order to reduce a pulling force to the film below the protective film and the adhesive layer below the film when peeling off the protective film from the film; and bonding the film to the frame of the backlight module with an extended bonding time in a bonding process in order to increase the adhering strength between the film and the bonding surface of the frame of the backlight module.

The roughening treatment uses an electric discharge machining treatment.

The electric discharge machining treatment is performed with a machining electrode having a current of 1 ampere.

The electric discharge machining treatment processes the bonding surface of the frame to have a roughness between 1.0 and 2.5 micrometers (μm).

The method for reducing the release force of a protective film comprises at least one of reducing a peeling angle of the protective film, slowing down a peeling speed of the protective film, and using a protective film having a smaller release force.

The peeling angle of the protective film is between 1-5 degrees.

The peeling speed of the protective film is between 10 mm/sec and 30 mm/sec.

The protective film having a smaller release force has a release force of between 50 and 100 grams.

The bonding time is between 1.5 and 3 seconds.

The adhering strength of the film bonded to the frame of the backlight module is between 0.3 and 0.51 MPa.

The invention provides another display panel manufacturing method for solving the phenomenon of Newton's rings on a display screen, comprising: conducting an electric discharge machining treatment with a machining electrode having a current of 1 ampere on the bonding surface of a frame of a backlight module, the electric discharge machining treatment processes the bonding surface of the frame to have a roughness between 1.0 and 2.5 micrometers (μm) in order to improve a securing force of the frame to an adhesive layer and a film thereon; reducing a release force of a protective film from the film above the backlight module in order to reduce a pulling force to the film below the protective film and the adhesive layer below the film when peeling off the protective film from the film; and bonding the film to the frame of the backlight module with an extended bonding time in a bonding process in order to increase the adhering strength between the film and the bonding surface of the frame of the backlight module.

The method for reducing the release force of a protective film comprises: at least one of reducing a peeling angle of the protective film, slowing down a peeling speed of the protective film, and using a protective film having a smaller release force.

The peeling angle of the protective film is between 1-5 degrees.

The peeling speed of the protective film is between 10 mm/sec and 30 mm/sec.

The protective film having a smaller release force has a release force of between 50 and 100 grams.

The bonding time is between 1.5 and 3 seconds.

The adhering strength of the film bonded to the frame of the backlight module is between 0.3 and 0.5 MPa.

The invention further provides another display panel manufacturing method for solving the phenomenon of Newton's rings on a display screen, comprising: conducting a roughening treatment to the bonding surface of a frame of a backlight module in order to improve a securing force of the frame to an adhesive layer and a film thereon; reducing a release force of a protective film from the film above the backlight module in order to reduce a pulling force to the film below the protective film and the adhesive layer below the film when peeling off the protective film from the film, wherein reducing the release force of a protective film comprises at least one of reducing a peeling angle of the protective film, slowing down a peeling speed of the protective film, and using a protective film having a smaller release force, the peeling angle of the protective film is between 1-5 degrees, the peeling speed of the protective film is between 10 mm/sec and 30 mm/sec; and bonding the film to the frame of the backlight module with an extended time in a bonding process in order to increase the adhering strength between the film and the bonding surface of the frame of the backlight module.

The protective film having a smaller release force has a release force of between 50 and 100 grams.

The bonding time is between 1.5 and 3 seconds.

Beneficial Effect

A display panel manufactured by implementing the above display panel manufacturing method, the ratio of the partial adsorption problem of the film on the backlight module to the lower polarizer of the liquid crystal cell is reduced from 23% to 0. The phenomenon of Newton's rings on the display panel caused by the adsorption problem is greatly improved.

DETAILED DESCRIPTION OF PREFERRED EMBODIMENTS

Figure 1:
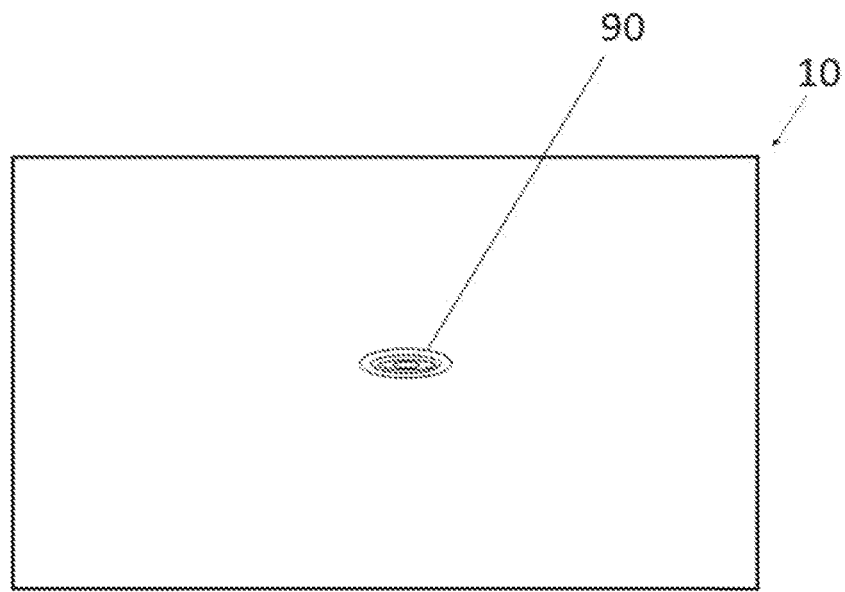
FIG. 1 is a schematic view showing the phenomenon of Newton's rings occurred on a display screen of a conventional display panel.
Figure 2:
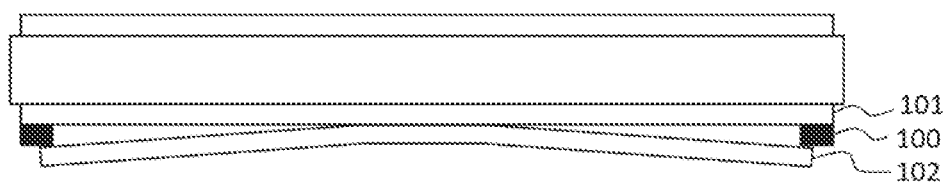
FIG. 2 is a schematic diagram showing partial absorption of a film of a backlight module and a lower polarizer of a liquid crystal cell in a conventional display panel.

The following description of the various embodiments is provided to illustrate the specific embodiments of the invention. The directional terms mentioned in the present invention, such as "on," "below", "front", "behind", "left", "right", "inside", "outside", "side", etc., are merely references of the direction in the drawings. Therefore, the directional terminology used is for the purpose of illustration and understanding of the invention rather than limiting the invention. In the drawings, the structurally similar elements are denoted by the same reference numerals.

In order to more clearly illustrate the technical solutions in the embodiments of the present invention, the following figures described in the embodiments will be briefly introduced. It is obvious that the drawings described below are merely some embodiments of the present invention, other drawings can also be obtained by the person ordinary skilled in the field based on these drawings without doing any creative activity.

Figure 3:
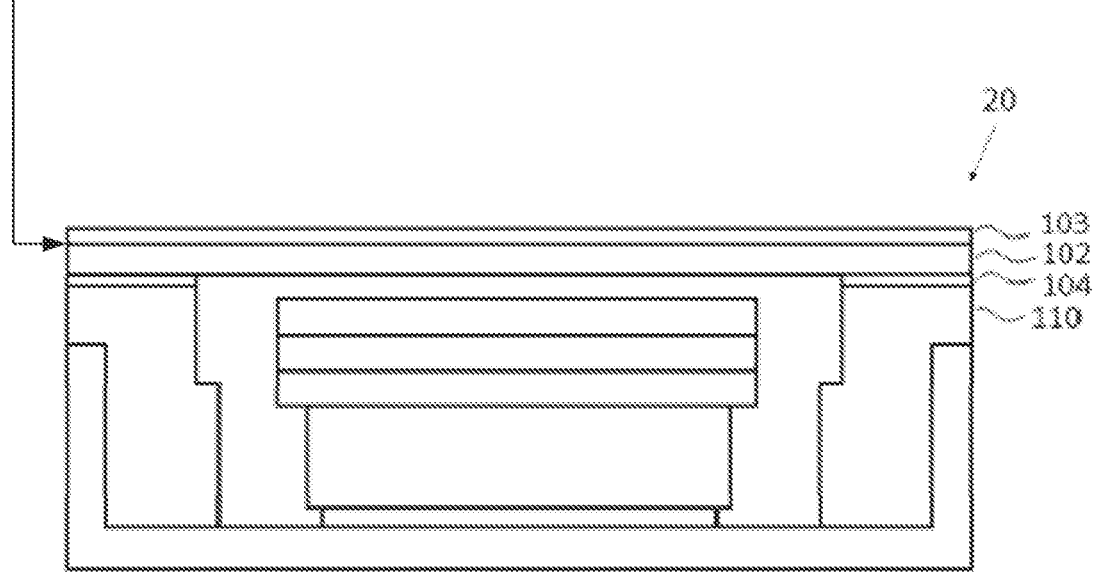
FIG. 3 is a cross-sectional view showing a structure of a backlight module of a display panel of the present invention.

Please refer to FIG. 3, the preferred embodiment provides a method for manufacturing a display panel. The method is directed to a bonding surface of a frame 110 of a backlight module 20, a release force of a protective film 103 from a film 102 above the backlight module 20, and bonding parameters of the film 102 and the frame 110, implementing structural stability measures for the backlight module 20 to solve the phenomenon of Newton's rings on the display screen.

As shown in FIG. 3, the bonding surface of the frame 110 of the backlight module 20 and the film 102 thereon are adhered by an adhesive layer 104.

The preferred embodiment provides a display panel manufacturing method for solving the phenomenon of Newton's rings on a display screen, comprising: conducting a roughening treatment to the bonding surface of a frame 110 of a backlight module 20 in order to improve a securing force of the frame 110 to an adhesive layer 104 and a film 102 thereon; reducing a release force of a protective film 103 from the film 102 (for example a brightness enhancement film) above the backlight module 20 in order to reduce a pulling force to the film 102 below the protective film 103 and the adhesive layer 104 below the film 102 when peeling off the protective film 103 from the film 102; and bonding the film 102 to the frame 110 of the backlight module 20 with an extended bonding time in a bonding process in order to increase the adhering strength between the film 102 and the bonding surface of the frame 110 of the backlight module 20.

The roughening treatment uses an electric discharge machining treatment.

The electric discharge machining treatment is performed with a machining electrode having a current of 1 ampere.

The electric discharge machining treatment processes the bonding surface of the frame 110 of the backlight module 20 to have a roughness between 1.0 and 2.5 micrometers (μm).

The method improves a securing force of the bonding surface of the frame 110 of the backlight module 20 to an adhesive layer 104 and a film 102 thereon, such that when peels off the protective film 103 of the film 102 of the backlight module 20, the release force does not pull up the adhesive layer 104 above the bonding surface of the frame 110 of the backlight module 20 and the film 102 above the adhesive layer 104.

The method for reducing the release force of the protective film 103 of the film 102 above the backlight module 20 comprises: at least one of reducing a peeling angle of the protective film 103, slowing down a peeling speed of the protective film 103, and using a protective film having a smaller release force.

The peeling angle of the protective film 103 is between 1-5 degrees. The peeling speed of the protective film 103 is between 10 mm/sec and 30 mm/sec.

The protective film having a smaller release force has a release force of between 50 and 100 grams.

The bonding time is between 1.5 and 3 seconds.

The adhering strength of the film bonded to the frame of the backlight module is between 0.3 and 0.5 MPa.

By implementing the above display panel manufacturing method, the ratio of the partial adsorption problem of the film 102 on the backlight module 20 to the lower polarizer 101 of the liquid crystal cell is reduced from 23% to 0%. The phenomenon of Newton's rings on the display screen caused by the adsorption problem is greatly improved.

The description of the above exemplary embodiments is only for the purpose of understanding the invention. It is to be understood that the present invention is not limited to the disclosed exemplary embodiments. It is obvious to those skilled in the art that the above exemplary embodiments may be modified without departing from the scope and spirit of the present invention.

What is claimed is:

1. A display panel manufacturing method for solving Newton's rings phenomenon on a display screen, comprising:
    conducting a roughening treatment to a bonding surface of a frame of a backlight module in order to improve a securing force of the frame to an adhesive layer and a first film thereon;
    reducing a release force of a protective film from the first film above the backlight module in order to reduce a pulling force to the first film below the protective film and the adhesive layer below the first film when peeling off the protective film from the first film; and
    bonding the first film to the frame of the backlight module with an extended bonding time in a bonding process in order to increase the adhering strength between the first film and the bonding surface of the frame of the backlight module.

2. The display panel manufacturing method according to claim 1, wherein the roughening treatment uses an electric discharge machining treatment.

3. The display panel manufacturing method according to claim 2, wherein the electric discharge machining treatment is performed with a machining electrode having a current of 1 ampere.

4. The display panel manufacturing method according to claim 2, wherein the electric discharge machining treatment processes the bonding surface of the frame to have a roughness between 1.0 and 2.5 micrometers (µm).

5. The display panel manufacturing method according to claim 1, wherein reducing the release force of the protective film comprises:
    at least one of reducing a peeling angle of the protective film, slowing down a peeling speed of the protective film, and using a protective film having a smaller release force.

6. The display panel manufacturing method according to claim 5, wherein the peeling angle of the protective film is between 1-5 degrees.

7. The display panel manufacturing method according to claim 5, wherein the peeling speed of the protective film is between 10 mm/sec and 30 mm/sec.

8. The display panel manufacturing method according to claim 5, wherein the protective film having a smaller release force has a release force of between 50 and 100 grams.

9. The display panel manufacturing method according to claim 1, wherein the bonding time is between 1.5 and 3 seconds.

10. The display panel manufacturing method according to claim 1, wherein the adhering strength of the first film bonded to the frame of the backlight module is between 0.3 and 0.5 MPa.

11. A display panel manufacturing method for solving Newton's rings phenomenon on a display screen, comprising:
    conducting an electric discharge machining treatment with a machining electrode having a current of 1 ampere on a bonding surface of a frame of a backlight module, the electric discharge machining treatment processes the bonding surface of the frame to have a roughness between 1.0 and 2.5 micrometers (µm) in order to improve a securing force of the frame to an adhesive layer and a first film thereon;
    reducing a release force of a protective film from the first film above the backlight module in order to reduce a pulling force to the first film below the protective film and the adhesive layer below the first film when peeling off the protective film from the first film; and
    bonding the first film to the frame of the backlight module with an extended bonding time in a bonding process in order to increase the adhering strength between the first film and the bonding surface of the frame of the backlight module.

12. The display panel manufacturing method according to claim 11, wherein reducing the release force of the protective film comprises:
    at least one of reducing a peeling angle of the protective film, slowing down a peeling speed of the protective film, and using a protective film having a smaller release force.

13. The display panel manufacturing method according to claim 12, wherein the peeling angles of the protective film are between 1-5 degrees.

14. The display panel manufacturing method according to claim 12, wherein the peeling speed of the protective film is between 10 mm/sec and 30 mm/sec.

15. The display panel manufacturing method according to claim 12, wherein the protective film having a smaller release force has a release force of between 50 and 100 grams.

16. The display panel manufacturing method according to claim 11, wherein the bonding time is between 1.5 and 3 seconds.

17. The display panel manufacturing method according to claim 11, wherein the adhering strength of the first film bonded to the frame of the backlight module is between 0.3 and 0.5 MPa.

18. A display panel manufacturing method for solving Newton's rings phenomenon on a display screen, comprising:
    conducting a roughening treatment to the bonding surface of a frame of a backlight module in order to improve a securing force of the frame to an adhesive layer and a first film thereon;
    reducing a release force of a protective film from the first film above the backlight module in order to reduce a pulling force to the first film below the protective film and the adhesive layer below the first film when peeling off the protective film from the first film, wherein reducing the release force of the protective film comprises at least one of reducing a peeling angle of the protective film, slowing down a peeling speed of the protective film, and using a protective film having a smaller release force, the peeling angle of the protective film is between 1-5 degrees, the peeling speed of the protective film is between 10 mm/sec and 30 mm/sec; and
    bonding the first film to the frame of the backlight module with an extended time in a bonding process in order to increase the adhering strength between the first film and the bonding surface of the frame of the backlight module.

19. The display panel manufacturing method according to claim 18, wherein the protective film having a smaller release force has a release force of between 50 and 100 grams.

20. The display panel manufacturing method according to claim 18, wherein the bonding time is between 1.5 and 3 seconds.

* * * * *